United States Patent [19]

Lardellier

[11] Patent Number: 5,255,510

[45] Date of Patent: Oct. 26, 1993

[54] THRUST REVERSER FOR A HIGH-BYPASS RATIO TURBOFAN ENGINE

[75] Inventor: Alain M. J. Lardellier, Melun, France

[73] Assignee: Societe Nationale d'Etude et de Construction de Moteurs d'Aviation "S.N.E.C.M.A.", Paris, France

[21] Appl. No.: 885,611

[22] Filed: May 19, 1992

[30] Foreign Application Priority Data

May 23, 1991 [FR] France .................. 91 06197

[51] Int. Cl.⁵ ............................................ F02K 3/02
[52] U.S. Cl. ................................ 60/226.2; 60/226.3; 244/110 B
[58] Field of Search ............... 60/226.1, 226.2, 226.3; 244/110 B

[56] References Cited

U.S. PATENT DOCUMENTS

| | | | |
|---|---|---|---|
| 3,280,561 | 10/1966 | Kutney | 60/226.2 |
| 3,652,036 | 3/1972 | Sans et al. | 244/53 B |
| 3,815,357 | 6/1974 | Brennan | 60/226.2 |
| 3,917,198 | 11/1975 | Sanders | 60/226.2 |
| 4,147,028 | 4/1979 | Rodgers | 60/226.2 |
| 4,216,923 | 8/1980 | Harris | 244/110 B |
| 4,793,134 | 12/1988 | Coplin et al. | 60/226.1 |
| 5,120,004 | 6/1992 | Matthias | 244/110 B |

FOREIGN PATENT DOCUMENTS

| | | |
|---|---|---|
| 0776908 | 1/1968 | Canada ................. 60/226.2 |
| 1479131 | 4/1967 | France . |
| 1589899 | 5/1970 | France . |
| 2625261 | 6/1989 | France . |
| 2650861 | 2/1991 | France . |
| 2064005 | 6/1981 | United Kingdom . |
| 2118248 | 10/1983 | United Kingdom . |
| 2230239 | 10/1990 | United Kingdom . |

*Primary Examiner*—Richard A. Bertsch
*Assistant Examiner*—Howard R. Richman
*Attorney, Agent, or Firm*—Bacon & Thomas

[57] ABSTRACT

A thrust reverser for a turbofan engine having a very high bypass ratio is disclosed having a plurality of baffles pivotally attached to a gas turbine engine housing so as to extend into a cold flow air stream emanating from the turbofan exit. The baffles are pivotally attached to the gas turbine engine housing and may be moved into extended, thrust reversing positions in which some of the baffles form a greater angle with the gas turbine engine housing than the remainder of the baffles. By moving the baffles located generally on opposite upper and lower portions of the gas turbine engine housing to the greater angles, the requisite thrust reversing force may be developed while at the same time minimizing the overall vertical dimension of the engine housing so as to provide the maximum amount of ground clearance for the turbofan engine. Secondary baffles are provided between the main baffles to close open spaces between the main baffles. Due to the orientation of the baffles in their extended, thrust reversing positions, the transverse configuration of the baffles is generally oval.

60 Claims, 6 Drawing Sheets

THRUST REVERSER FOR A HIGH-BYPASS RATIO TURBOFAN ENGINE

BACKGROUND OF THE INVENTION

The present invention relates to a thrust reverser for a turbofan engine, more particularly a thrust reverser for such a turbofan engine having a very high bypass ratio.

Turbofan engines are, of course, well known in the art and typically comprise a gas turbine engine having a housing extending around the engine, and a fan housing radially spaced from and extending around the gas turbine engine housing so as to define a cold flow air duct between the fan housing and the gas turbine engine housing. A turbofan, driven by the gas turbine engine and having one or more fan stages, draws air into the cold flow air duct through an inlet and directs the air outwardly in a downstream direction through a cold flow exhaust opening.

It is also known to make such engines having thrust reversers which deflect the flow of the cold flow air in order to provide the thrust reversing force. These devices have proven particularly effective in such turbofan engines having a high bypass ratio.

Typically, the known thrust reversers comprise displaceable baffle elements which may be extended into the cold flow air stream so as to redirect the air stream and provide a thrust reversing force to the air frame. When the turbofan engine operates in a forward thrust mode, the displaceable baffles are retracted such that they generally assume the surface configuration of the gas turbine engine housing. Examples of such known thrust reversers can be found in French Patents 1,479,131; 2,625,261; and 2,650,861.

The known thrust reversers, however, have proven to be bulky, heavy and have not permitted the engine structure to have an external diameter sufficient to provide requisite ground clearance, especially in such turbofan engines having a very high bypass ratio.

SUMMARY OF THE INVENTION

A thrust reverser for a turbofan engine having a very high bypass ratio is disclosed having a plurality of baffles pivotally attached to the gas turbine engine housing so as to extend into the cold flow air stream emanating from the turbofan exit. The baffles are pivotally attached to the gas turbine engine housing and may be moved into extended, thrust reversing positions in which some of the baffles form a greater angle with the gas turbine engine housing than the remainder of the baffles. By moving the baffles located generally on opposite upper and lower portions of the gas turbine engine housing to the greater angles, the requisite thrust reversing force may be developed while at the same time minimizing the overall vertical dimension of the engine housing so as to provide the maximum amount of ground clearance for the turbofan engine.

Secondary baffles are provided between the main baffles to close open spaces between the main baffles. Due to the orientation of the baffles in their extended, thrust reversing positions, the transverse configuration of the baffles is generally oval.

A complementary air passage may be defined by the gas turbine engine housing such that the passage has an inlet located upstream of the main baffles and an exit which is controlled by the baffle position. Doors may be provided to selectively open and close the complementary passage inlet. When the doors are open, the downstream end of the main baffles may be slightly displaced from the gas turbine engine housing such that the complementary passage allows turbofan air to pass completely through the passage.

DETAILED DESCRIPTION OF THE PREFERRED EMBODIMENTS

A particular advantageous application of the present invention can be found in turbofan engines with very high bypass ratios which have proven to have significant specific fuel consumption advantages for commercial jet aircraft. To secure the maximum effect of these advantages, weight and drag of the engine configuration must be reduced and resulting problems in mounting the engine to the aircraft must also be solved. In particular, such problems have involved the reduction diameter of the overall outside diameter of the turbofan engine to assure sufficient clearance between a wing mounted engine and the ground surface.

Figure 1:
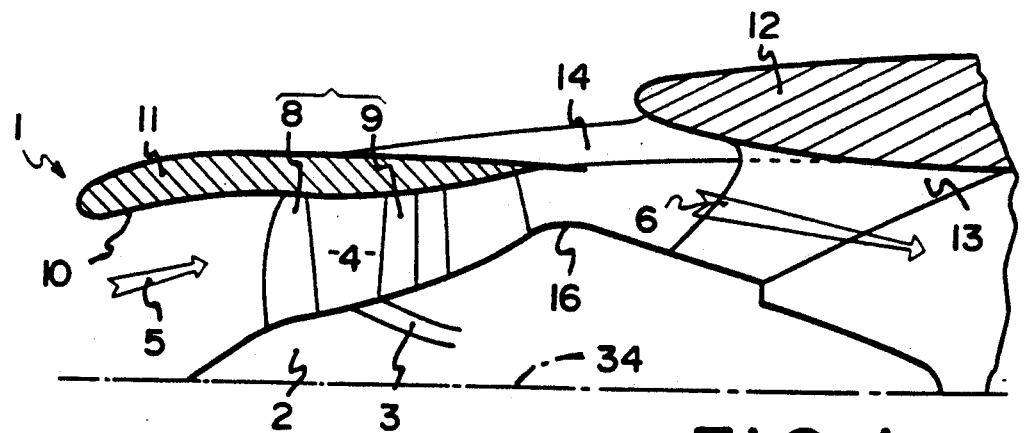
FIG. 1 is a longitudinal cross-sectional view of a turbofan engine with the thrust reverser according to the present invention oriented in a forward thrust position.
Figure 2:
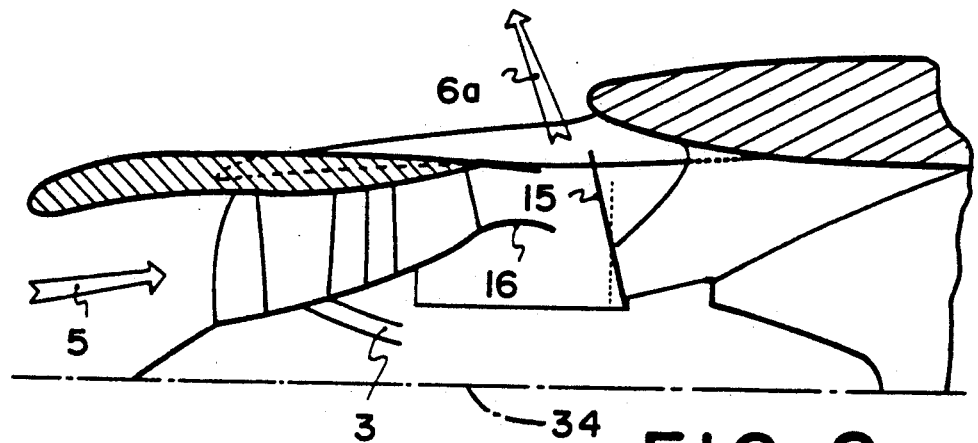
FIG. 2 is a cross-sectional view similar to FIG. 1 illustrating the thrust reverser in a thrust reversing mode.

A first embodiment of the thrust reverser according to the present invention is illustrated in FIGS. 1-12. As best illustrated in FIGS. 1 and 2, the turbofan engine 1 comprises a turbojet engine 2 enclosed by housing 16 having a primary intake duct 3. A generally annular, cold flow air duct 4 extends around the turbojet engine housing 16 and serves as a duct for cold flow air illustrated by arrows 5 and 6. A turbofan comprising at least one stage of moving blades 8 and at least one stage of fixed vanes 9 is located within fan housing 11 having internal surface 10. A housing 11 of the short type is illustrated, although it is to be understood that the principles of the present invention may be utilized with other types of fan housings.

The turbofan engine 1 is illustrated as being mounted under aircraft wing 12 by a pylon 13, located generally at the rear of the engine, and by one or more arms 14 attached generally to the forward portion of the engine.

The engine 1 is schematically shown in FIG. 1 in the forward thrust configuration with a portion of the overall thrust of the engine being provided by the cold flow air 6 emanating from the downstream exit of the cold flow air duct 4. FIG. 2 shows the same engine 1 in the reverse thrust operating mode. The thrust reversing force is provided by deflecting the cold flow air in the direction of arrow 6a by extending main baffles 15. In the forward thrust operating mode, the main baffles 15 are retracted such that they are generally flush with the housing 16 of the turbojet engine 2.

Figure 3:
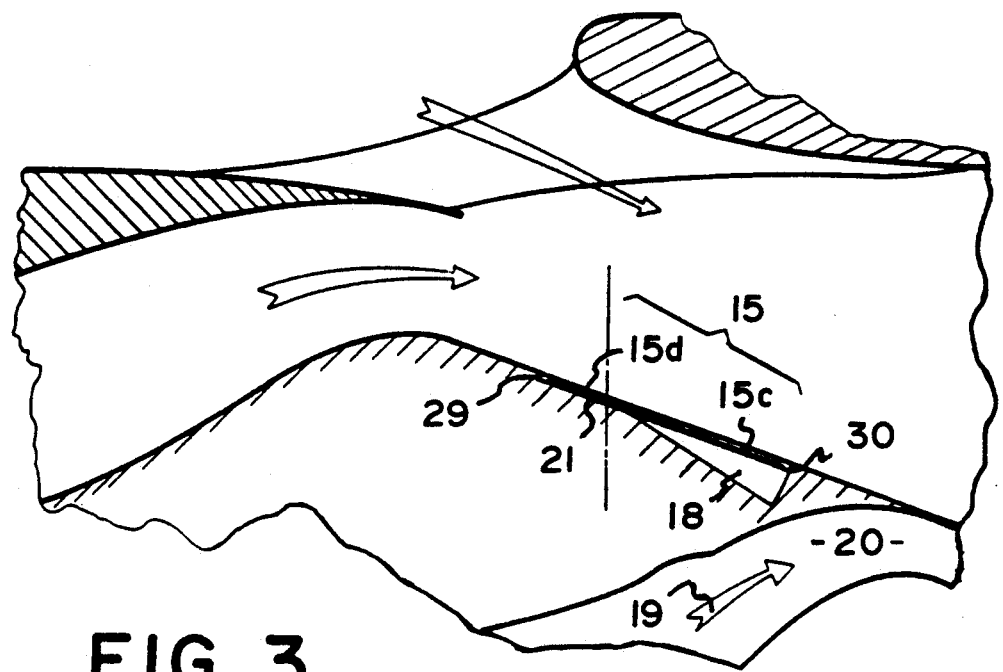
FIG. 3 is an enlarged, cross-sectional view similar to FIG. 1 illustrating the thrust reversing baffles in the forward thrust positions.
Figure 4:
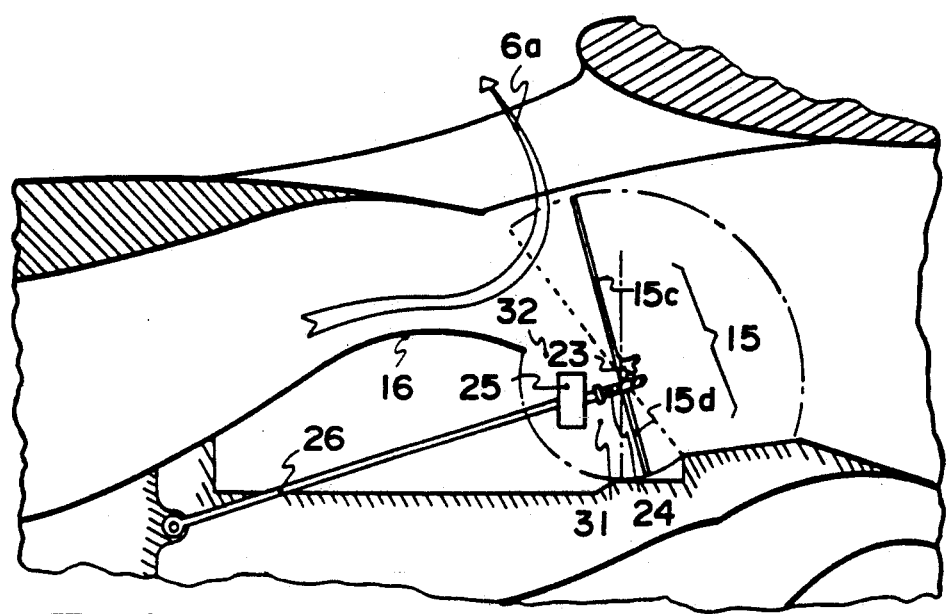
FIG. 4 is an enlarged, cross-sectional view similar to FIG. 3, illustrating the baffles in their thrust reversing positions.

FIGS. 3 and 4 illustrate the details of the thrust reverser baffles 15. As can be seen in FIG. 3, during forward thrust operation, the main baffles 15 are in their retracted positions such that their outer surfaces are substantially flush with the outer surface of the gas turbine engine housing 16 so as to form a continuous surface which promotes aerodynamic efficiency. The gas turbine engine housing 16 defines recesses 18 located interiorly of a downstream portion of the baffles 15. The primary or hot flow duct 20 for the turbojet engine directs gases, in known fashion, in the direction of arrow 19.

Figure 5:
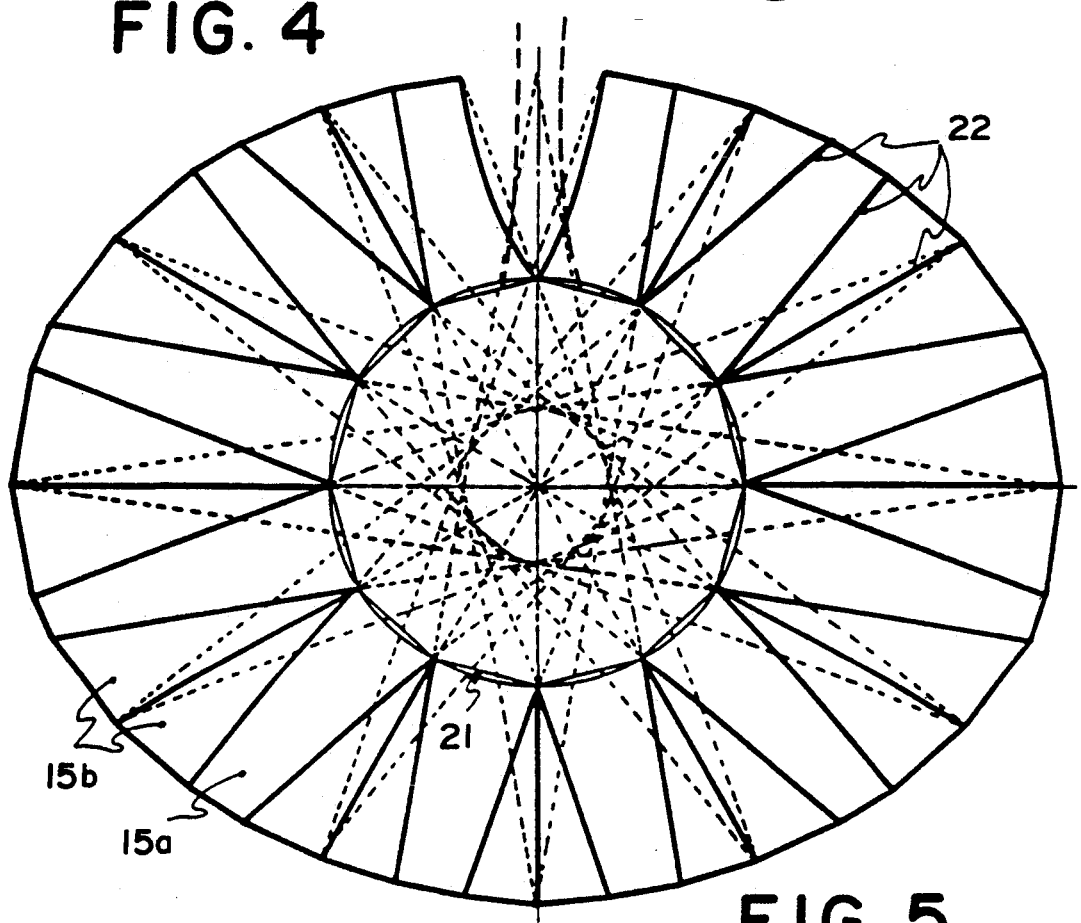
FIG. 5 is a front view of the thrust reversing baffles in their extended, thrust reversing positions.
Figure 6:
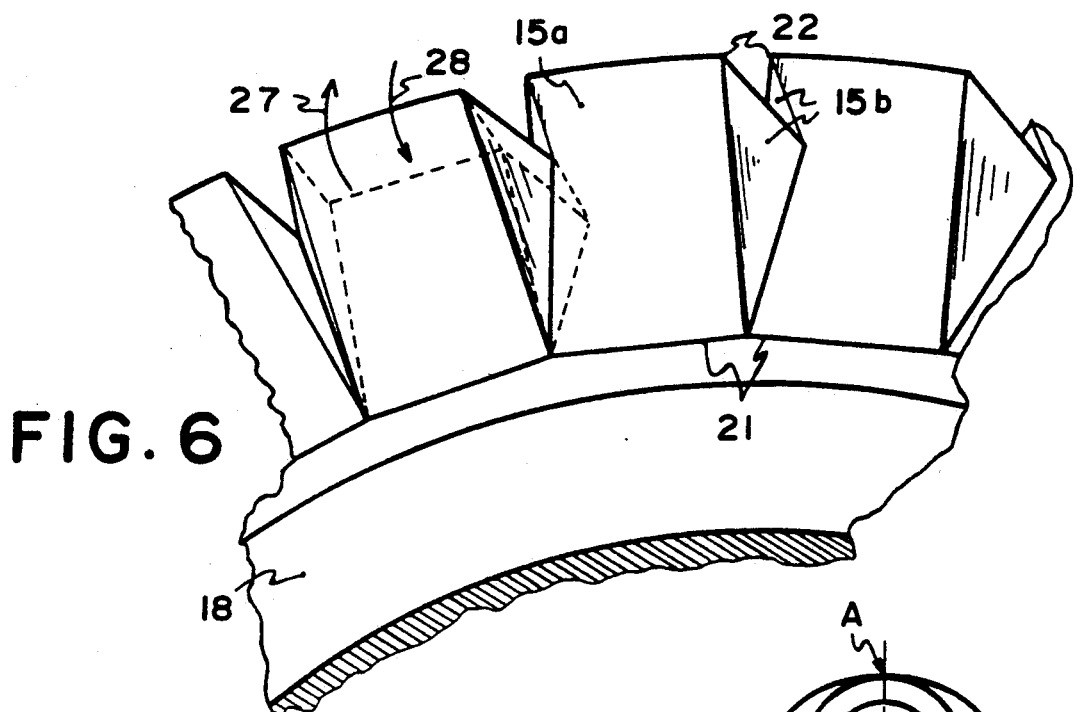
FIG. 6 is a partial, perspective view of the thrust reversing baffles intermediate their extended and retracted positions.
Figure 7:
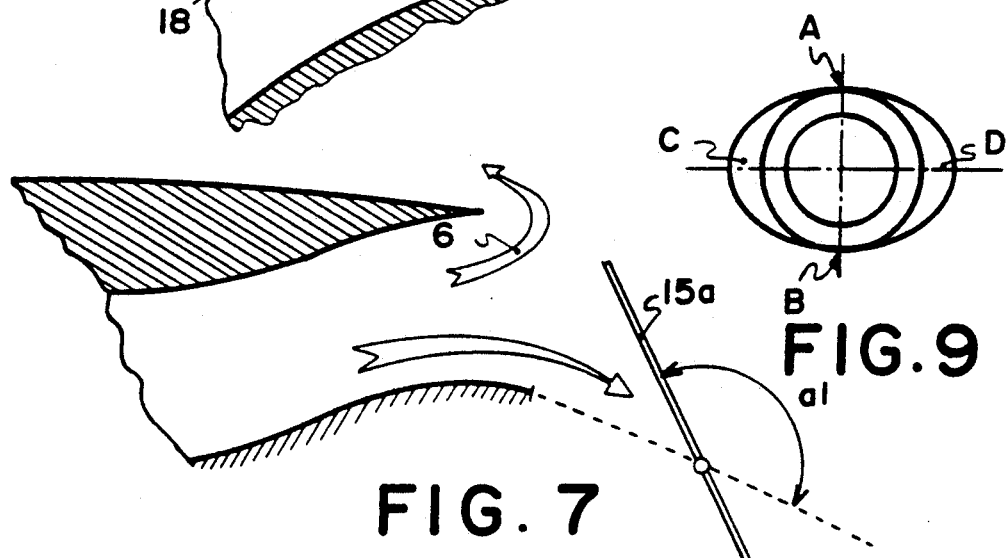
FIG. 7 is a partial, longitudinal cross-sectional, schematic diagram illustrating the thrust reversing baffles extended at a first angle.
Figure 9:
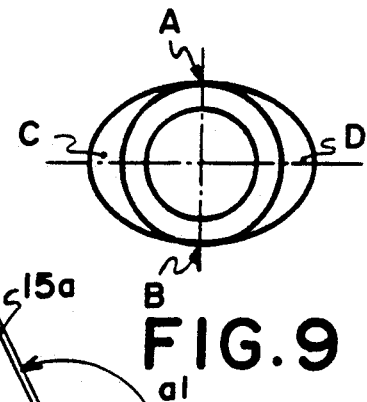
FIG. 9 is a schematic, front view of the thrust reverser according to the present invention.
Figure 8:
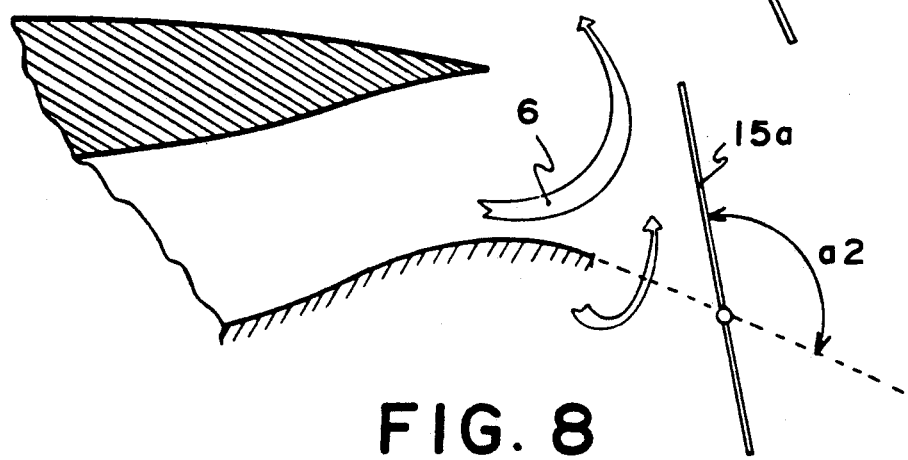
FIG. 8 is a view similar to FIG. 7 illustrating the thrust reversing baffles extended to a second angle.
Figure 10:
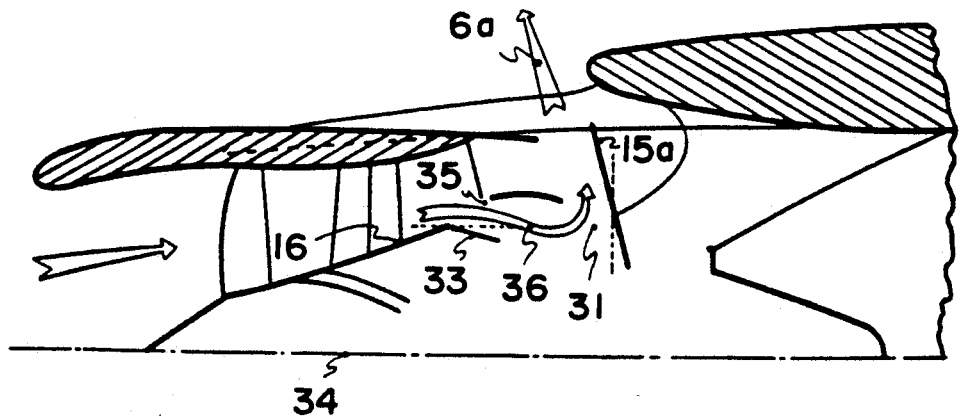
FIG. 10 is a longitudinal cross-sectional view similar to FIG. 2 in which the gas turbine engine housing defines a complementary passage.
Figure 11:
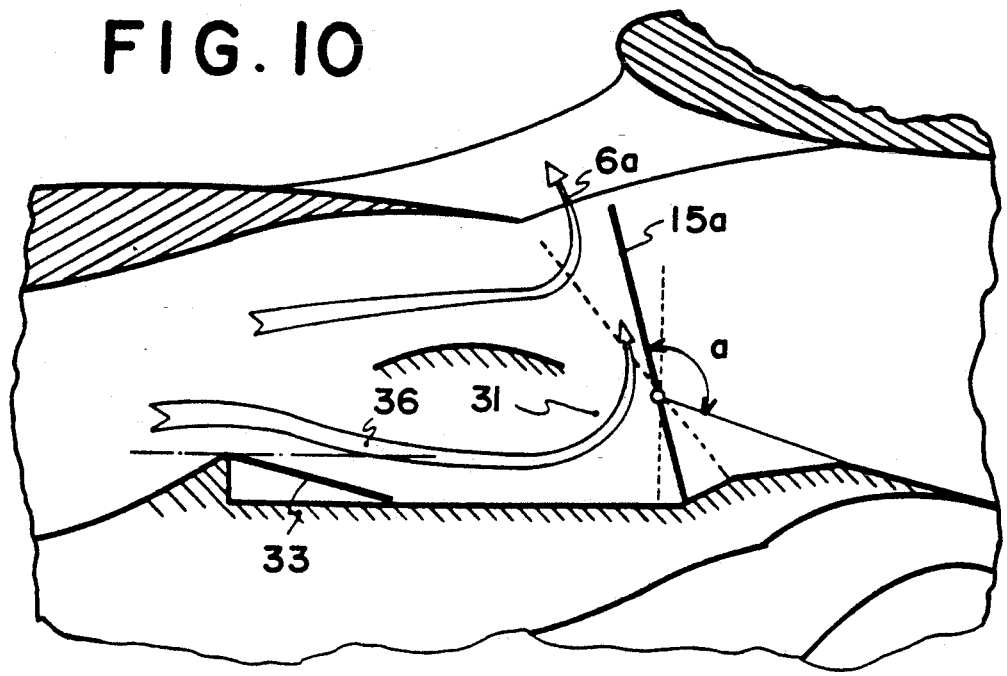
FIG. 11 is an enlarged, detailed view of the complementary passage and thrust reversing baffles illustrated in FIG. 10.

When operating in the reverse thrust mode, as illustrated in FIG. 4, the baffles 15 extend outwardly from the gas turbine engine housing 16 into the airflow emanating from the cold flow air duct 4 so as to redirect the air in the direction of arrow 6a. The main baffles 15 may consist of 12 main baffle members 15a located around the longitudinal axis 34 of the engine such that they pivot about axes 21 which extend generally perpendicular to the longitudinal axis of the engine. The main baffle members 15a are interconnected by secondary baffles 15b which eliminate the gaps between adjacent main baffles 15a when in their extended, thrust reversing positions. Each secondary baffle 15b, as illustrated in FIGS. 5 and 6, has a generally triangular configuration and is hingedly attached to adjacent main baffles 15a at 22 and to each other. When the main baffles 15a are retracted into their forward thrust positions, the secondary baffles 15b fold and enter the recesses 18 formed in the gas turbine engine housing 16.

The actuating device for controlling the movement of the baffles 15 may comprise a first gear 23 fixedly attached to each of the main baffles 15a and a screw or worm gear 24 which engages gear 23. Motor 25 is operatively connected to the screw or worm gear 24 so as to rotate the screw or worm gear 24. Motor 25 may be a hydraulic or pneumatic motor, and is supported by link rods 26 connected to the turbojet engine 2 or the gas turbine engine housing 16.

Each main baffle 15a may have its own, individual control system, as described above, or a single control system may be utilized to operate several main baffles 15a. The various control components may be synchronized by any known devices, such as CARDAN or HOLDAM links or metal cables. The control links assure the displacement of the main baffles 15a about their pivot axes 21 in the manner schematically illustrated in FIG. 6. As can be seen, when the thrust reverser is actuated toward its thrust reversal position, the baffles 15 move in the direction of arrows 27 and the secondary baffles 15b move apart in order to form a continuous frustrum of a cone once the end of the baffle displacement is reached. The transverse configuration of the extended baffles of the thrust reverser, illustrated in FIG. 5, is controlled by the angle "a" which the main baffles 15a define with the outer surface of the gas turbine engine housing 16. When the thrust reverser is moved to its forward thrust position, the main baffles 15a move in the direction of arrows 28 (see FIG. 6) and the secondary baffles 15b move together about hinge attachments 22 so that they may enter the recesses 18 formed in the gas turbine engine housing 16.

As can be seen in FIGS. 3 and 4, the pivot axis 21 of each of the main baffles 15a is located between the downstream end portion 15c and the upstream end portion 15d. In the forward thrust position, the main baffle ends 15c and 15d are generally flush with the outer surface of the gas turbine engine housing 16. When moving to the reverse thrust positions, the downstream end portion 15c is pivoted outwardly away from the surface of the gas turbine engine housing 16, such that the main baffle 15 moves about pivot axis 21 in a generally counterclockwise direction (as seen in FIG. 3). The upstream end portion 15d, when displaced inwardly in the reverse thrust position, opens an inner well 31 defined by the gas turbine housing 16 so as to minimize air turbulence in zone 32 between the baffle 15 and the edge of the gas turbine housing 16 which would degrade the aerodynamic efficiency of the thrust reverser and result in lower engine performance.

The positioning of the main baffles 15 in their thrust reversing positions also serves to control the direction of the deflected cold flow air. By controlling the angles through which the main baffles 15 are displaced, relative to the gas turbine engine housing 16, the overall transverse configuration of the thrust reverser, illustrated in FIG. 5, can be controlled. The angle "a" through which the main baffles 15a are displaced is chosen such that it varies with the circumferential positions of the baffles. Accordingly, at upper and lower portions of the gas turbine engine housing, generally designated at A and B in FIG. 9, the baffles 15a are moved through an angle "$a_1$", illustrated in FIG. 7. In the lateral side portions of the gas turbine engine housing, generally designated as zones C and D in FIG. 9, the main baffles 15a are moved through an angle "$a_2$" which is less than angle "$a_1$". In this case, the baffles 15a assume positions controlling a maximum outlet cross-section of the thrust reverser compatible with the effectiveness of the thrust reversal orientation. As seen from the front of the engine, the thrust reverser baffles assume an outer oval shape with the cold flow air being directed primarily through the lateral sides of the engine. Depending upon individual applications of the turbofan engine, the circumferential distribution of the displacement angles for the main baffles 15 may be varied so as to direct the cold flow in other directions.

Figure 12:
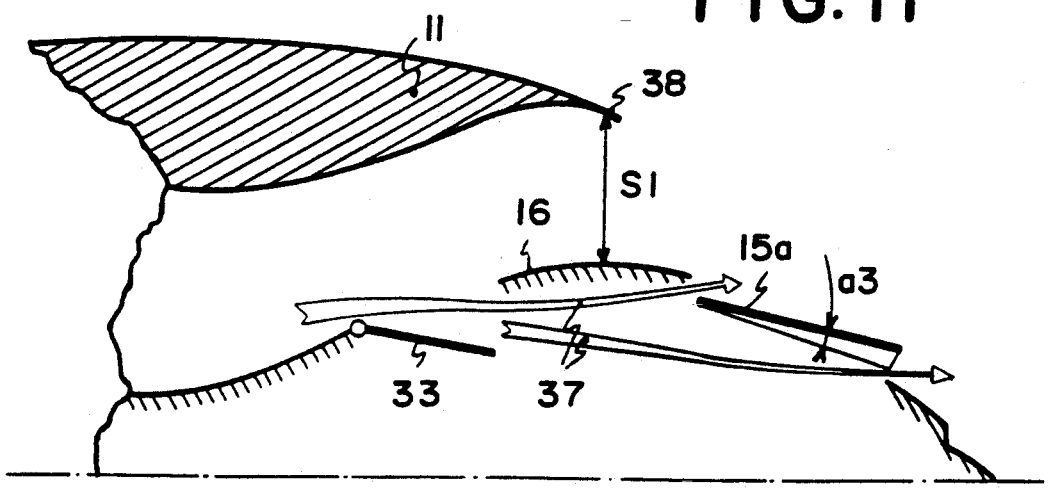
FIG. 12 is an enlarged, cross-sectional view similar to FIG. 10, illustrating the thrust reversing baffles extending at a third angle.

In some applications, the gas turbine engine housing 16 may define a complementary passage having an inlet 35 located upstream of the thrust reverser baffles and communicating with the well 31. A door 33 is movable so as to selectively open and close the inlet 35. When in the open position, an airflow 36 will flow into the well 31 and also be deflected in a thrust reversing direction, indicated generally by arrow 6a. In engines with very high bypass ratios, in particular ratios of 10 and larger, it may be necessary during operational phases of the turbofan engine, in particular during aircraft takeoff, to increase the cross sectional area S1 (see FIG. 12) of the cold flow air duct exhaust. In this instance, the downstream end portion of the main baffles 15a may be slightly displaced away from the surface of the gas turbine engine housing 16 at a shallow angle "$a_3$". In this position, when the doors 33 are open so as to allow air from the cold flow air duct 4 to pass into the complementary passage through inlet 35, an airflow 37, as illustrated in FIG. 12, will take place to effectively increase the cross-sectional area of the cold flow air duct 4.

Figure 13:
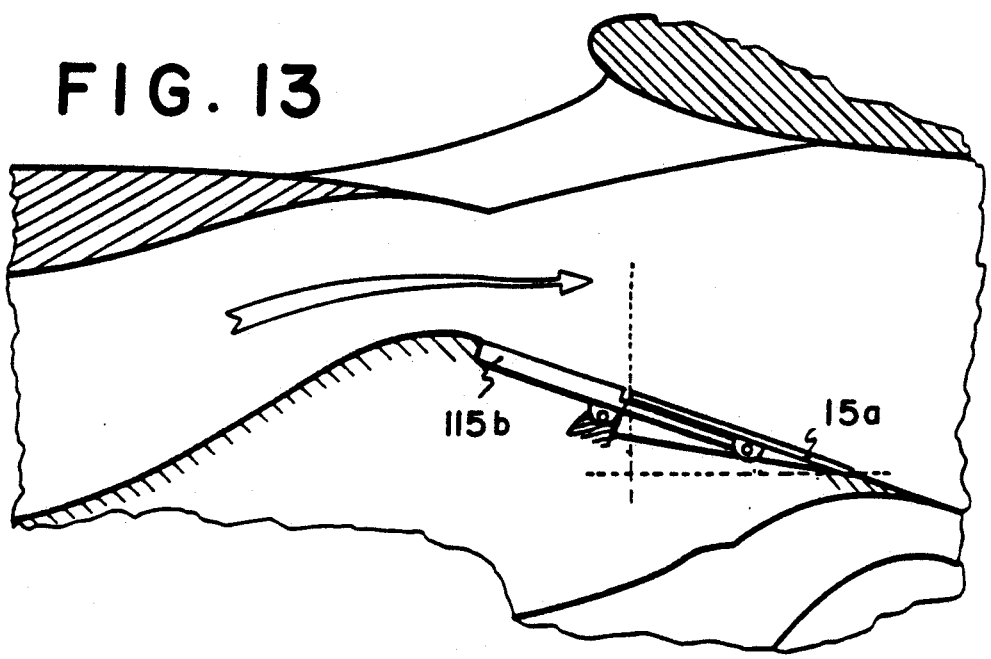
FIG. 13 is an enlarged, longitudinal, cross-sectional view of the thrust reverser according to the present invention illustrating a second embodiment of the thrust reverser baffles.
Figure 14:
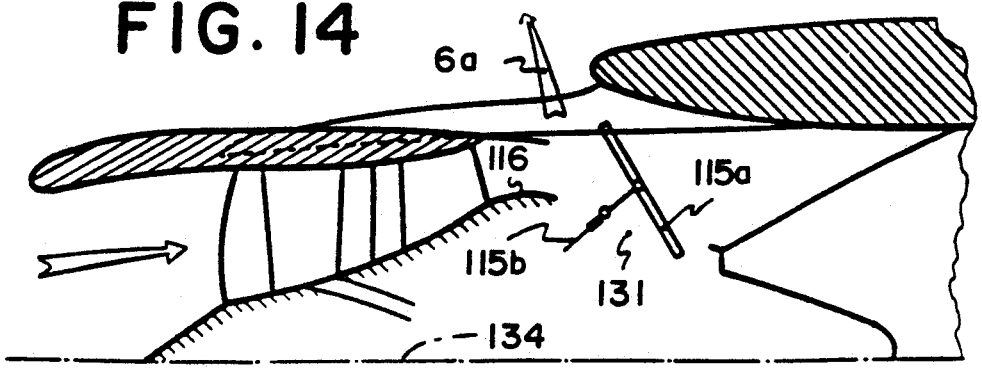
FIG. 14 is a longitudinal, cross-sectional view of a turbofan engine incorporating the thrust reversing baffles of FIG. 13 showing the baffles in their extended, thrust reversing positions.

A second embodiment of the thrust reverser according to the present invention is illustrated in FIGS. 13-19. In this embodiment, the main baffles comprise a downstream baffle member 115a pivotally attached to a downstream edge of upstream baffle member 115b. As can be seen in FIG. 13, upstream baffle member 115b is pivotally attached to the gas turbine engine housing 116 so as to pivot about an axis 44 extending generally perpendicular to the longitudinal axis 134 of the engine and located between an upstream end portion and a downstream end portion of baffle member 115b. Similarly, baffle member 115a is pivotally attached to baffle member 115b by a pivot means located between an upstream end and a downstream end of baffle 115a.

Figure 15:
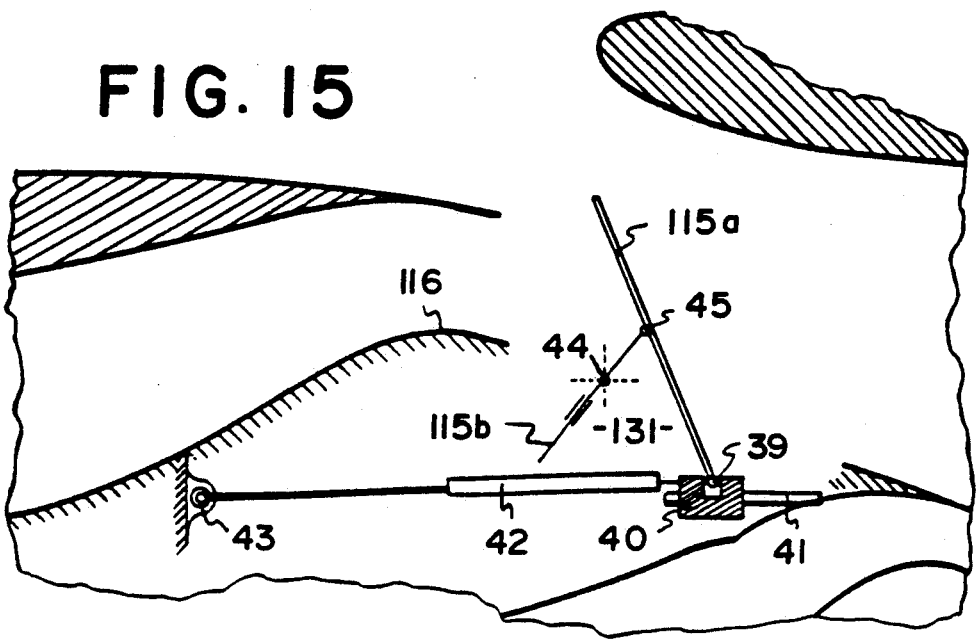
FIG. 15 is an enlarged, cross-sectional view of the thrust reverser of FIG. 14.
Figure 16:
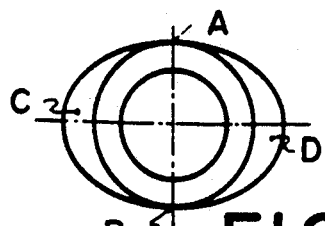
FIG. 16 is a schematic, front view of the second embodiment of the thrust reverser according to the present invention.
Figure 17:
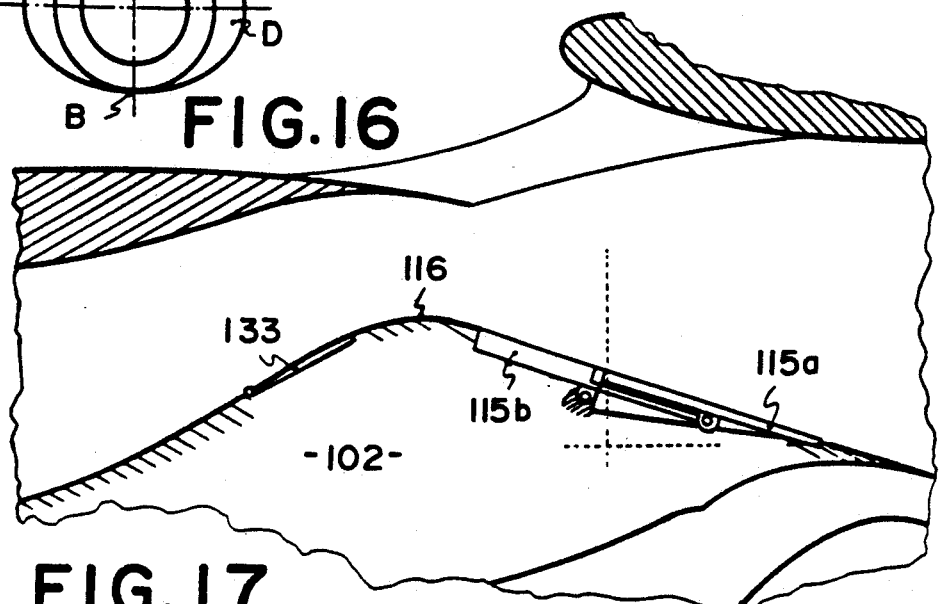
FIG. 17 is an enlarged, longitudinal cross sectional view similar to FIG. 13 wherein the gas turbine engine housing defines a complementary passage.
Figure 18:
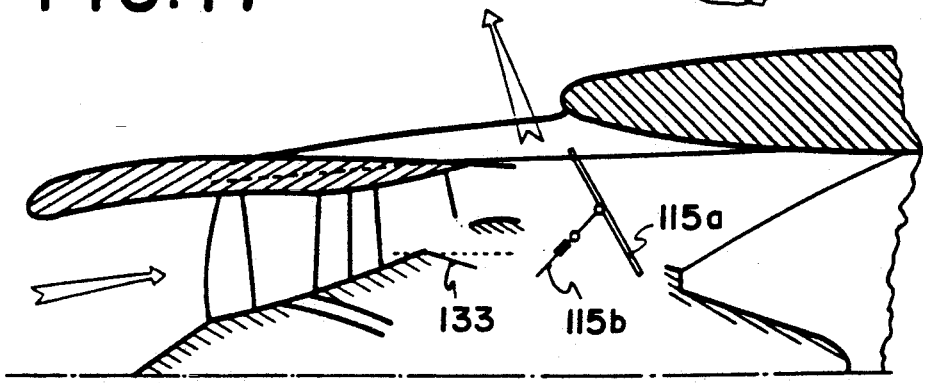
FIG. 18 is a longitudinal, cross-sectional view, similar to FIG. 17 illustrating the complementary passage and the thrust reverser baffles in their extended positions.
Figure 19:
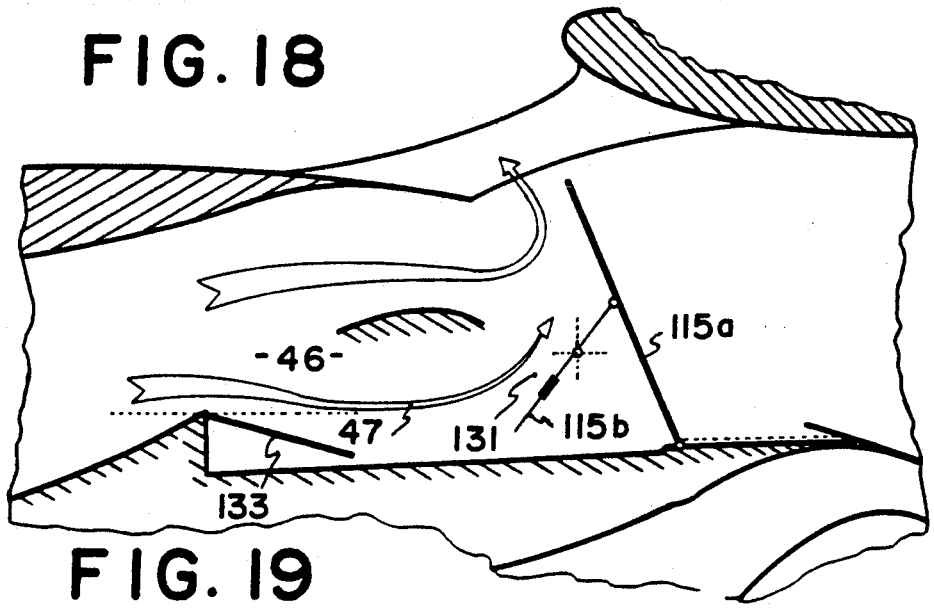
FIG. 19 is an enlarged, cross-sectional view similar to FIG. 18 showing the complementary passage and the thrust reversing baffles.

Each of the baffle members 115a are operatively connected to ring member 40 which is slidably attached to the gas turbine engine housing 116 by stationary slides 41. As can be seen in FIG. 15, this enables ring member 40 to move in either a fore or aft direction generally parallel to the longitudinal axis 134 of the engine when actuated by actuator 42. Actuator 42 is connected to the ring member 40 and also to a stationary portion 43 of the gas turbine engine 2 or the gas turbine engine housing 116. Actuators 42 may be hydraulic or pneumatic actuators, or may be a mechanical actuator of the screw type. As in the previously described embodiment, secondary baffles are interposed between the main baffle members 115a so as to close the gaps between adjacent baffles when in their open, thrust reversing positions.

Baffle members 115b are pivotally attached to the gas turbine engine housing 116 via hinge 44 and are pivoted to the baffle member 115a by hinge 45. A well 131 defined by the gas turbine engine housing is directly open through the inner wall bounding the cold flow air path at the gas turbine engine housing 116. In this instance, the control system for the baffles 115a achieves the variable angle of main baffle opening depending upon the circumferential position of the main baffles around the longitudinal axis of the engine as in the previous embodiment. The angle "$a_1$" at circumferential positions A and B is greater than the angle "$a_2$" of the main baffles located at circumferential positions C and D to define the baffle configuration shown in FIG. 16. As in the previous embodiment, the circumferential positions may be varied depending upon the particular application of the engine.

As in the previous embodiment, well 131 may communicate with the cold flow air duct 4 through complementary passage inlet 46, the opening and closing of which may be controlled by door 133. When door 133 is opened and the thrust reverser baffles are in their thrust reversing positions, cold flow air from duct 4 may enter the well 131 and be directed outwardly, in the direction of arrow 47 in FIG. 19.

The foregoing description is provided for illustrative purposes only and should not be construed as in any way limiting this invention, the scope of which is defined solely by the appended claims.

I claim:

1. A thrust reverser for a turbofan type engine having a high bypass ratio comprising:
    a) a gas turbine engine housing having an outer surface and extending around a longitudinal axis;
    b) a fan housing extending about the gas turbine engine housing so as to define a cold flow air duct therebetween, the fan housing defining an upstream intake opening and a downstream cold flow exhaust opening;
    c) a plurality of main baffles pivotally attached to the gas turbine engine housing and movable between first positions in which the main baffles are generally flush with the outer surface of the gas turbine engine housing, and second positions wherein the main baffles extend into the cold flow air passing through the cold flow air duct to deflect the cold flow air in a thrust reversing direction; and,
    d) actuating means to move the main baffles between their first and second positions such that, in their second positions, a first plurality of main baffles extend at an angle "$a_1$" with respect to the outer surface of the gas turbine engine housing and a second plurality of main baffles extend at an angle "$a_2$" with respect to the outer surface of the gas turbine engine housing such that "$a_1$" is greater than "$a_2$", wherein the first plurality of main baffles are disposed on generally opposite first portions of the gas turbine engine housing and wherein the second plurality of main baffles are disposed on generally opposite second portions of the gas turbine engine housing, the second portions being circumferentially displaced approximately 90° around the gas turbine engine housing from the generally opposite first portions.

2. The thrust reverser of claim 1 wherein the first plurality of main baffles are located on upper and lower portions of the gas turbine engine housing and the second plurality of baffles are located on opposite side portions of the gas turbine engine housing.

3. The thrust reverser of claim 1 wherein each main baffle has an upstream end and a downstream end, and further comprising pivot means pivotally attaching the main baffles to the gas turbine engine housing between the upstream and downstream ends.

4. The thrust reverser of claim 3 wherein the actuating means comprises means to move the downstream ends of the main baffles outwardly away from the gas turbine engine housing as the main baffles are moved into their second positions.

5. The thrust reverser of claim 1 wherein the gas turbine engine housing defines a complementary flow passage having an inlet opening into the cold flow air duct upstream of the main baffles, an outlet closed by the main baffles when in their first positions and opened when the main baffles are in their second positions and further comprising door means to selectively open and close the complementary flow passage inlet.

6. The thrust reverser of claim 5 wherein each main baffle has an upstream end and a downstream end and further comprising pivot means pivotally attaching the main baffles to the gas turbine engine housing between the upstream and downstream ends.

7. The thrust reverser of claim 6 wherein the actuating means comprises means to move the downstream ends of the main baffles outwardly away from the gas turbine engine such that the main baffles define an angle "$a_3$" with the outer surface of the gas turbine engine housing, wherein angle "$a_3$" is less than angles "$a_1$" and "$a_2$" so as to effectively increase the area of the cold flow exhaust opening.

8. The thrust reverser of claim 1 further comprising secondary baffles operatively associated with adjacent main baffles so as to extend between adjacent main baffles when in their second positions.

9. The thrust reverser of claim 8 wherein each of the secondary baffles comprises a pair of generally triangularly shaped secondary baffle members, each secondary baffle member hingedly attached to a main baffle and to another secondary baffle member.

10. The thrust reverser of claim 3 wherein the pivot means pivotally attaches the main baffles to the gas turbine engine housing such that they move about pivot axes extending generally perpendicular to the longitudinal axis.

11. The thrust reverser of claim 10 wherein the actuating means comprises:
a) a first gear affixed to each main baffle;
b) a second gear operatively engaging each first gear; and,
c) motor means operatively associated with each second gear.

12. The thrust reverser of claim 11 wherein the motor means comprises a hydraulic motor.

13. The thrust reverser of claim 11 wherein the motor means comprises a pneumatic motor.

14. The thrust reverser of claim 1 wherein each main baffle comprises:
a) a first baffle member pivotally attached to the gas turbine engine housing; and,
b) a second baffle member pivotally attached to the first baffle member.

15. The thrust reverser of claim 14 wherein each first and second baffle member has an upstream end and a downstream end, and wherein the first baffle member is pivotally attached to the gas turbine engine housing between its upstream and downstream ends.

16. The thrust reverser of claim 15 wherein the second baffle member is pivotally attached to a downstream end of the first baffle member at a location between the upstream and downstream ends of the second baffle member.

17. The thrust reverser of claim 16 wherein the actuating means comprises:
a) a ring member operatively connected to the downstream ends of each of the second baffle members; and,
b) means operatively associated with the ring member to move the ring member in a direction generally parallel to the longitudinal axis.

18. The thrust reverser of claim 16 wherein the gas turbine engine housing defines a complementary flow passage having an inlet opening into the cold flow air duct upstream of the main baffles, an outlet closed by the main baffles when in their first positions and opened when the main baffles are in their second positions, and further comprising door means to selectively open and close the complementary flow passage inlet.

19. A thrust reverser for a turbofan type engine having a high bypass ratio comprising:
a) a gas turbine engine housing having an outer surface and extending around a longitudinal axis;
b) a fan housing extending about the gas turbine engine housing so as to define a cold flow air duct therebetween, the fan housing defining an upstream intake opening and a downstream cold flow exhaust opening;
c) a plurality of main baffles pivotally attached to the gas turbine engine housing and movable between first positions in which the main baffles are generally flush with the outer surface of the gas turbine engine housing, and second positions wherein the main baffles extend into the cold flow air passing through the cold flow air duct to deflect the cold flow air in a thrust reversing direction;
d) actuating means to move the main baffles between their first and second positions such that, in their second positions, a first plurality of main baffles extend at an angle "$a_1$" with respect to the outer surface of the gas turbine engine housing and a second plurality of main baffles extend at an angle "$a_2$" with respect to the outer surface of the gas turbine engine housing such that "$a_1$" is greater than "$a_2$".
e) a complementary flow passage defined by the engine housing and having an inlet opening into the cold flow air duct upstream of the main baffles, an outlet closed by the main baffles when in their first positions and opened when the main baffles are in their second positions; and,
f) door means to selectively open and close the complementary flow passage.

20. The thrust reverser of claim 19 wherein the first plurality of main baffles are disposed on generally opposite first portions of the gas turbine engine housing.

21. The thrust reverser of claim 20 wherein the first plurality of main baffles are located on upper and lower portions of the gas turbine engine housing and the second plurality of baffles are located on opposite side portions of the gas turbine engine housing.

22. The thrust reverser of claim 19 wherein each main baffle has an upstream end and a downstream end, and further comprising pivot means pivotally attaching the main baffles to the gas turbine engine housing between the upstream and downstream ends.

23. The thrust reverser of claim 22 wherein the actuating means comprises means to move the downstream ends of the main baffles outwardly away from the gas turbine engine housing as the main baffles are moved into their second positions.

24. The thrust reverser of claim 22 wherein the actuating means comprises means to move the downstream ends of the main baffles outwardly away from the gas turbine engine such that the main baffles define an angle "$a_3$" with the outer surface of the gas turbine engine housing, wherein angle "$a_3$" is less than angles "$a_1$" and "$a_2$" so as to effectively increase the area of the cold flow exhaust opening.

25. The thrust reverser of claim 19 further comprising secondary baffles operatively associated with adjacent main baffles so as to extend between adjacent main baffles when in their second positions.

26. The thrust reverser of claim 25 wherein each of the secondary baffles comprises a pair of generally triangularly shaped secondary baffle members, each secondary baffle member hingedly attached to a main baffle and to another secondary baffle member.

27. The thrust reverser of claim 22 wherein the pivot mean pivotally attaches the main baffles to the gas turbine engine housing such that they move about pivot axes extending generally perpendicular to the longitudinal axis.

28. The thrust reverser of claim 27 wherein the actuating means comprises:
 a) a first gear affixed to each main baffle;
 b) a second gear operatively engaging each first gear; and
 c) motor means operatively associated with each second gear.

29. The thrust reverser of claim 28 wherein the motor means comprises a hydraulic motor.

30. The thrust reverser of claim 28 wherein the motor means comprises a pneumatic motor.

31. The thrust reverser of claim 19 wherein each main baffle comprises:
 a) a first baffle member pivotally attached to the gas turbine engine housing; and,
 b) a second baffle member pivotally attached to the first baffle member.

32. The thrust reverser of claim 31 wherein each first and second baffle member has an upstream end and a downstream end, and wherein the first baffle member is pivotally attached to the gas turbine engine housing between its upstream and downstream ends.

33. The thrust reverser of claim 32 wherein the second baffle member is pivotally attached to a downstream end of the first baffle member at a location between the upstream and downstream ends of the second baffle member.

34. The thrust reverser of claim 33 wherein the actuating means comprises:
 a) a ring member operatively connected to the downstream ends of each of the second baffle members; and,
 b) means operatively associated with the ring member to move the ring member in a direction generally parallel to the longitudinal axis.

35. A thrust reverser for a turbofan type engine having a high bypass ratio comprising:
 a) a gas turbine engine housing having an outer surface and extending around a longitudinal axis;
 b) a fan housing extending about the gas turbine engine housing so as to define a cold flow air duct therebetween, the fan housing defining an upstream intake opening and a downstream cold flow exhaust opening;
 c) a plurality of main baffles pivotally attached to the gas turbine engine housing and movable between first positions in which the main baffles are generally flush with the outer surface of the gas turbine engine housing, and second positions wherein the main baffles extend into the cold flow air passing through the cold flow air duct to deflect the cold flow air in a thrust reversing direction;
 d) actuating means to move the main baffles between their first and second positions such that, in their second positions, a first plurality of main baffles extend at an angle "$a_1$" with respect to the outer surface of the gas turbine engine housing and a second plurality of main baffles extend at an angle "$a_2$" with respect to the outer surface of the gas turbine engine housing such that "$a_1$" is greater than "$a_2$"; and,
 e) secondary baffles operatively associated with adjacent main baffles so as to extend between adjacent main baffles when in their second positions wherein each of the secondary baffles comprises a pair of generally triangularly shaped secondary baffle members, each secondary baffle member hingedly attached to a main baffle and to another secondary baffle member.

36. The thrust reverser of claim 35 wherein the first plurality of main baffles are disposed on generally opposite first portions of the gas turbine engine housing.

37. The thrust reverser of claim 36 wherein the first plurality of main baffles are located on upper and lower portions of the gas turbine engine housing and the second plurality of baffles are located on opposite side portions of the gas turbine engine housing.

38. The thrust reverser of claim 35 wherein each main baffle has an upstream end and a downstream end, and further comprising pivot means pivotally attaching the main baffles to the gas turbine engine housing between the upstream and downstream ends.

39. The thrust reverser of claim 38 wherein the actuating means comprises means to move the downstream ends of the main baffles outwardly away from the gas turbine engine housing as the main baffles are moved into their second positions.

40. The thrust reverser of claim 38 wherein the actuating means comprises means to move the downstream ends of the main baffles outwardly away from the gas turbine engine such that the main baffles define an angle "$a_3$" with the outer surface of the gas turbine engine housing, wherein angle "$a_3$" is less than angles "$a_1$" and "$a_2$" so as to effectively increase the area of the cold flow exhaust opening.

41. The thrust reverser of claim 38 wherein the pivot means pivotally attaches the main baffles to the gas turbine engine housing such that they move about pivot axes extending generally perpendicular to the longitudinal axis.

42. The thrust reverser of claim 41 wherein the actuating means comprises:
 a) a first gear affixed to each main baffle;
 b) a second gear operatively engaging each first gear; and,
 c) motor means operatively associated with each second gear.

43. The thrust reverser of claim 42 wherein the motor means comprises a hydraulic motor.

44. The thrust reverser of claim 42 wherein the motor means comprises a pneumatic motor.

45. The thrust reverser of claim 35 wherein each main baffle comprises:
   a) a first baffle member pivotally attached to the gas turbine engine housing; and,
   b) a second baffle member pivotally attached to the first baffle member.

46. The thrust reverser of claim 45 wherein each first and second baffle member has an upstream end and a downstream end, and wherein the first baffle member is pivotally attached to the gas turbine engine housing between its upstream and downstream ends.

47. The thrust reverser of claim 46 wherein the second baffle member is pivotally attached to a downstream end of the first baffle member at a location between the upstream and downstream ends of the second baffle member.

48. The thrust reverser of claim 47 wherein the actuating means comprises:
   a) a ring member operatively connected to the downstream ends of each of the second baffle members; and,
   b) means operatively associated with the ring member to move the ring member in a direction generally parallel to the longitudinal axis.

49. A thrust reverser for a turbofan type engine having a high bypass ratio comprising:
   a) a gas turbine engine housing having an outer surface and extending around a longitudinal axis;
   b) a fan housing extending about the gas turbine engine housing so as to define a cold flow air duct therebetween, the fan housing defining an upstream intake opening and a downstream cold flow exhaust opening;
   c) a plurality of main baffles pivotally attached to the gas turbine engine housing and movable between first positions in which the main baffles are generally flush with the outer surface of the gas turbine engine housing, and second positions wherein the main baffles extend into the cold flow air passing through the cold flow air duct to deflect the cold flow air in a thrust reversing direction wherein each main baffle comprises:
      i) a first baffle member pivotally attached to the gas turbine engine housing; and,
      ii) a second baffle member pivotally attached to the first baffle member, wherein each first and second baffle member has an upstream end and a downstream end, and wherein the first baffle member is pivotally attached to the gas turbine engine housing between its upstream and downstream ends and wherein the second baffle member is pivotally attached to a downstream end of the first baffle member at a location between the upstream and downstream ends of the second baffle member; and,
   d) actuating means to move the main baffles between their first and second positions such that, in their second positions, a first plurality of main baffles extend at an angle "$a_1$" with respect to the outer surface of the gas turbine engine housing and a second plurality of main baffles extend at an angle "$a_2$" with respect to the outer surface of the gas turbine engine housing such that "$a_1$" is greater than "$a_2$".

50. The thrust reverser of claim 49 wherein the first plurality of main baffles are disposed on generally opposite first portions of the gas turbine engine housing.

51. The thrust reverser of claim 50 wherein the first plurality of main baffles are located on upper and lower portions of the gas turbine engine housing and the second plurality of baffles are located on opposite side portions of the gas turbine engine housing.

52. The thrust reverser of claim 49 wherein each main baffle has an upstream end and a downstream end, and further comprising pivot means pivotally attaching the main baffles to the gas turbine engine housing between the upstream and downstream ends.

53. The thrust reverser of claim 52 wherein the actuating means comprises means to move the downstream ends of the main baffles outwardly away from the gas turbine engine housing as the main baffles are moved into their second positions.

54. The thrust reverser of claim 52 wherein the actuating means comprises means to move the downstream ends of the main baffles outwardly away from the gas turbine engine such that the main baffles define an angle "$a_3$" with the outer surface of the gas turbine engine housing, wherein angle "$a_3$" is less than angles "$a_1$" and "$a_2$" so as to effectively increase the area of the cold flow exhaust opening.

55. The thrust reverser of claim 52 wherein the pivot means pivotally attaches the main baffles to the gas turbine engine housing such that they move about pivot axes extending generally perpendicular to the longitudinal axis.

56. The thrust reverser of claim 55 wherein the actuating means comprises:
   a) a first gear affixed to each main baffle;
   b) a second gear operatively engaging each first gear; and,
   c) motor means operatively associated with each second gear.

57. The thrust reverser of claim 56 wherein the motor means comprises a hydraulic motor.

58. The thrust reverser of claim 56 wherein the motor means comprises a pneumatic motor.

59. The thrust reverser of claim 47 wherein the actuating means comprises:
   a) a ring member operatively connected to the downstream ends of each of the second baffle members; and,
   b) means operatively associated with the ring member to move the ring member in a direction generally parallel to the longitudinal axis.

60. The thrust reverser of claim 47 further comprising secondary baffles operatively associated with adjacent main baffles so as to extend between adjacent main baffles when in their second positions.

* * * * *